US007360910B2

(12) United States Patent
Korral et al.

(10) Patent No.: US 7,360,910 B2
(45) Date of Patent: Apr. 22, 2008

(54) INTERNALLY ILLUMINATED SIGN

(76) Inventors: Menachem Korral, 14 Israel Porath Street, Ramot, Jerusalem, 97298 (IL); Zvi Perach, 19b Mevo Hametziltaim, Maale Edumim 98390 (IL); Eliyahu Korral, 78 Moriah Street, Nof Ayalon Bet (IL) 99785

( * ) Notice: Subject to any disclaimer, the term of this patent is extended or adjusted under 35 U.S.C. 154(b) by 40 days.

(21) Appl. No.: 11/374,833

(22) Filed: Mar. 14, 2006

(65) Prior Publication Data

US 2006/0265921 A1 Nov. 30, 2006

Related U.S. Application Data

(63) Continuation-in-part of application No. PCT/IL2004/000850, filed on Sep. 14, 2004.

(60) Provisional application No. 60/504,945, filed on Sep. 15, 2003.

(51) Int. Cl.
*G01D 11/28* (2006.01)

(52) U.S. Cl. ........................ 362/30; 362/223; 362/240; 362/812; 40/563; 40/564; 40/575; 40/576

(58) Field of Classification Search .................. 362/29, 362/30, 800, 812, 222, 223, 240; 40/563, 40/564, 575, 576
See application file for complete search history.

(56) References Cited

U.S. PATENT DOCUMENTS 2,190,526 A 2/1940 Wells
4,952,023 A 8/1990 Bradshaw et al.
5,105,568 A 4/1992 Branning
5,329,716 A 7/1994 Fitte
5,388,357 A 2/1995 Malita
5,539,623 A 7/1996 Gurz et al.
5,729,925 A 3/1998 Prothero
5,950,340 A 9/1999 Woo
6,215,409 B1 * 4/2001 Blach ......................... 362/800

FOREIGN PATENT DOCUMENTS

WO WO03/010738 A2 2/2003

* cited by examiner

*Primary Examiner*—Stephen F Husar

(57) ABSTRACT

An illuminated sign, internally illuminated by a source such as one or more LED'S generally located at one end, and having a character panel with at least partially transmissive portions to define the characters of the sign. The character panel is curved so as to face the source more squarely at distances further from the source. By this arrangement, the geometric fall-off of illumination with increasing distance from the source is compensated for by the curvature of the character panel, such that more uniform illumination is provided than with prior art flat panels. Power management systems for solar charged illuminated signs are also described, in which the illumination level of the sign is adjusted according to the ambient solar flux and according to the charge-holding capacity of the battery. The system also warns of the impending end of battery life without interrupting the sign functionality.

16 Claims, 11 Drawing Sheets

$CE = P = \Delta . l_i$

INTERNALLY ILLUMINATED SIGN

REFERENCE TO PRIOR APPLICATIONS

This application is a continuation in parts, and claims the benefit of priority to, PCT application No. PCT/IL2004/000850, filed Sep. 14, 2004, which in turn claims the benefit of priority to U.S. provisional application No. 60/504,945, filed Sep. 15, 2003. Both the above identified applications are incorporated herein by reference in their entirety.

FIELD OF THE INVENTION

The present invention relates to the field of internally illuminated signs, and especially those having uniform illumination over their operative area and having a very low energy requirement for their operation.

BACKGROUND OF THE INVENTION

Numerous applications exist which require the use of an illuminated sign for night-time visibility in situations where access to an electric mains supply is either unavailable or inconvenient to supply. Some such applications are in house signs, road signs, directional signs, road milestones, camping sites, emergency signs such as in aircraft or in underground car parks, display signs for advertising purposes or for providing other information. Such signs should ideally have uniform illumination over the whole of the area in which the sign's information is to be displayed, should be visible by day as well as by night, and should provide a level of illumination visible at some tens of meters at night with a minimal electrical power input.

In the prior art, many different types of such signs exist, and in many of them, the illumination source is generally internal to the sign structure, and is powered by a secondary cell or battery, which is maintained charged by solar power. One of the main problems to be solved in all such internally illuminated signs is the provision of uniform illumination without any regions of higher or lower intensity. Reflectors and/or diffusers are generally necessary in order to improve uniformity. Large areas arrays of fluorescent tubes are quite effective to this end, but are very energy consumptive.

A number of prior art, internally illuminated signs have been described using light emitting diodes (LED's), which are generally more energy saving than incandescent or fluorescent sources, because of their ability to localize their emission in the direction of desired illumination. Some examples of such prior art signs are to be found in U.S. Pat. Nos. 5,105,568, 5,539,623, 5,388,357, 5,729,925 and 4,952,023, and in International Publication No. WO 03/010738, all of which are hereby incorporated by reference, each in its entirety. In such signs, reflective surfaces are generally used within a light box to direct the illumination towards the sign panel. The reflective surfaces can be either on the back of the character panel, or on other internal reflective surfaces, or usually on both. Commercial products are available for facilitating these functions, such as those supplied by the 3M Company of St. Paul, Minn. 55144, which provides a range of products designed for enhancement of the performance of internally illuminated signs. One such product is called a blockout film, products 3635-20B and No. 3635-22B, and is designed for preparing the indices of such signs. These films have a black matte surface on one side, which is used as the outer side of the sign, and a white surface on the other side, used to reflect light internally from the back of the indices.

Many of the above-described prior art signs have a number of disadvantages. Firstly, they often use a source located at one end of a light box with internal reflective surfaces, and although this is a convenient arrangement for such signs, the design of such prior art signs does not generally provide sufficiently uniform illumination on the sign panel. Secondly, they generally use flat panels, and a source located at one or both ends of a light box may generate an illumination gradient down the length of such a flat panel sign. Thirdly, the manufacturing method of the panel with the display character, such as is described in WO 03/010738, is complicated, generally requiring at least two silk screen printed layers, one light blocking layer and one diffusively reflective layer, and may possibly not provide an optimally illuminative effect. Also, most of the above-described prior art signs are single-sided, and signs visible from both sides have to be constructed by placing a pair of signs back-to-back.

There therefore exists a need for an improved internally illuminated sign, which overcomes many of the disadvantages of such prior art signs. Besides the primary aim of improvement in the illumination effect, the sign should preferably have good performance under limited solar illumination levels, should be reliable even in winter time, and should provide an indication of low battery charge capacity and continued operation even when the battery charge capacity is low.

The disclosures of each of the publications mentioned in this section and in other sections of the specification, are hereby incorporated by reference, each in its entirety.

SUMMARY OF THE INVENTION

The present invention seeks to provide a new method and apparatus for providing uniform illumination on the display screen of an internally illuminated sign, such as is generally illuminated from an end by means of an optical source. The method is based on the application of a curvature to the display screen, which compensates for the effect of the fall-off of illumination with distance from the source. For any uniform source, having an approximately uniform angular intensity profile over its useable angular range, each angular segment provides the same luminous flux. However, angular segments illuminating regions of the screen further from the source provide a lower level of illumination on the screen, because of the increased area which the divergence of the angular segment must illuminate. In order to compensate for this decreased illumination, the display screen, according to the present invention, is curved inwards towards the illuminating beam such that the further the point of impingement of the beam from the source, the more close to normal is the angle of incidence of the impinging beam on the screen, so as to maintain the same length of screen illuminated by the same angular segment. In this manner, the curvature of the screen is able to compensate for the fall off of the illumination with distance from the source. In order to clarify the nomenclature used in this application, it should be noted that the term illumination is often used in its popular sense, to mean the luminous flux per unit area of a surface, which is also known as the luminance or brightness of the surface. However, occasional use has also been made of terms such as intensity, or intensity of illumination, or likewise, and it is to be understood that the meaning, when related to the display surface, is intended to mean the luminous flux per unit area of the surface, or the brightness of the surface.

Such a curved display screen has a number of applications in the field of low power, internally illuminated signs, such as are used for house numbering at night, for street signs, for advertising, for emergency lighting, and other similar applications. When such a curved screen is used in such signs, a more uniform level of illumination is achieved than with prior art signs using flat screens to display their information. Furthermore, because the curved display screen allows compensation of the geometric illumination fall-off effect, it is possible to provide more direct illumination on the display screen itself, thus placing less reliance for the screen illumination on energy-robbing reflection effects. As a consequence, the luminous efficiency of signs constructed with such curved display screens is enhanced.

The light propagating within the sign is preferably reflected by a high reflectivity coating, most preferably specularly reflective, applied to the rear side of the opaque parts of the display characters. Though the term character generally means letter or digit, it is to be understood that the present invention is equally applicable for use with any form displayed on the illuminated screen, whether textual or graphic. The term character is thus used throughout this application, and is also thuswise claimed, to mean any such letter, digit, symbol or any other graphic form. The light reflected from the rear of the reflective display panel can preferably be returned to the display screen by means of a reflective back-plate, which essentially generates a mirror image of the rear of the reflective display panel. The use of a highly reflective rear surface for the panel indices is a significant advantage over prior art display panels using diffusively reflective back surface indices, because the increased reflectivity increases the light utilization. This is particularly significant for the direct illumination of the curved display panel of the present invention.

According to further preferred embodiments of the present invention, there are provided double sided signs, using a pair of curved display screens illuminated uniformly by sources disposed between the display screens and either at one end of the sign, or in the center of the sign, without the need for any additional optically active surfaces other than the display panels themselves on the two sides of the sign.

The present invention also seeks to provide new methods and systems for providing efficient power management in solar charged illuminated signs in general. A battery discharge system is provided which adjusts itself to the solar illumination level by measuring the battery depth of discharge (DOD) or state of charge (SOC). It also provides mutual battery back up to ensure use of the full service life of the batteries, and provides indication of the impending end of battery function, but without resulting in the extinction of the sign.

In order to accomplish these features of the present invention, firstly, in a multi-character sign made up of several single character signs, all of the batteries in the separate units making up the composite sign are connected in parallel, thus providing back-up functionality to each other. Secondly, the electronic system checks the charge level of the batteries, either continuously or at predetermined intervals. When this level drops below a certain predetermined level, a circuit in the sign is operative to reduce the illuminating power. If this reduction of power does not cause recovery of charge level of battery, power is further reduced, until a balance is achieved between the available solar charging level, and the illumination level of the sign, taking into account the current condition of the battery. In this way, the sign is provided with a power management system which adjusts the sign's performance level in accordance with the solar illumination conditions at the site of mounting of the sign, whether based on seasonal or even daily variation of the solar intensity, or on the initial installation location of the sign, and also taking into account the charge holding capacity of the battery.

When the battery is close to the end of its useful life, typically after several years, its charge level even when fully charged drops below a certain predetermined level, and an indication is given that the battery life is close to its end, such as by causing the sign to start blinking. By this means, warning is given that the battery charge holding capacity is low, and that the battery or batteries have to be exchanged, without stopping the sign from fulfilling its function.

There is thus provided in accordance with a preferred embodiment of the present invention, a sign, internally illuminated by at least one source of light, comprising a first display surface illuminated by the light, the display surface comprising regions generally opaque to the light and regions at least partly transmissive to the light, the regions at least partly transmissive to the light having the form of at least one character to be displayed by the sign, wherein the at least one source of light is mounted in the sign such that the light is at least partially directed at the display surface, and wherein the display surface has a curved contour, concave to the at least one source, such that light from the at least one source impinges at a point on the display surface at an angle of incidence which varies according to the distance of the point of impingement from the source.

Additionally and preferably, the above mentioned sign may also comprise at least one reflective surface disposed adjacent to and facing the first display surface. In such a case, this at least one reflective surface disposed adjacent to and facing the first display surface may preferably be a second display surface illuminated by the light, the second display surface comprising regions generally opaque to the light and regions at least partly transmissive to the light, the regions at least partly transmissive to the light having the form of at least one character to be displayed by the sign, and the regions generally opaque to the light having a reflective back facing the first display surface.

In accordance with still another preferred embodiment of the present invention, in any of the above-mentioned internally illuminated signs, the curved contour may preferably be shaped such that variations in the luminous flux per unit area of the light impinging on at least the first display surface, as a function of the distance of the point of impingement from the at least one source, is reduced compared with variations in the luminous flux per unit area impinging on a flat display surface. Alternatively and preferably, the curved contour may be shaped such that the luminous flux per unit area of the light impinging on at least the first display surface is essentially independent of the distance of the point of impingement from the at least one source of light.

In any of the above-described signs, the side of the generally opaque regions of the first display surface facing the at least one source of light preferably comprises a specular high reflective layer, such that the light not transmitted through the at least partly transmissive regions of the first display panel is reflected back specularly into the sign. The specular high reflective layer preferably comprises a metallic layer.

There is further provided in accordance with still another preferred embodiment of the present invention, an internally illuminated sign as described hereinabove, and in which the generally opaque regions of the display surface facing the at least one source comprise a diffusively reflective layer, such that the light not transmitted through the at least partly transmissive regions of the display panel is reflected back diffusively into the interior space. The at least partly transmissive region may preferably be diffusive, or the display surface may preferably be constructed of a thin plastic base sheet, and this plastic base sheet may be diffusive.

Furthermore, in those preferred embodiments comprising an at least one reflective surface disposed adjacent the display surface, this at least one reflective surface may preferably be a reflective back cover of the sign. In accordance with a further preferred embodiment of the present invention, in those preferred embodiments where the at least one reflective surface is a second display surface illuminated by the light, the sign is a double sided sign.

There is even further provided in accordance with a preferred embodiment of the present invention, an internally illuminated sign as described above, and wherein the at least one source of light is at least one light emitting diode. This at least one light emitting diode may preferably have a beam cross section adapted to the general shape of the interior space of the sign.

In those of the above-mentioned embodiments having a specular high reflective layer in the display surface, the display surface may preferably comprise a high reflective metallic layer, on which is formed a generally opaque coating defining a negative of the shape of the character, such that the character defines a clear area over the high reflective metallic layer, the clear area being a mask for the removal of the high reflective metallic layer in the region of the character. In such a case, the generally opaque coating applied around the character shape may preferably be applied by means of a printing process, and the removal of the high reflective metallic layer may preferably be performed by an etching process. Alternatively and preferably, the display surface may be produced by a method comprising the steps of forming the character on the high reflective metallic layer by means of a generally opaque coating applied around the character shape, such that the character defines a clear area over the high reflective metallic layer, and removing the high reflective metallic layer in the region of the character, using the clear area as a mask. The removing is preferably done by an etching process.

Furthermore, in accordance with yet another preferred embodiment of the present invention, there is provided an internally illuminated sign according to any of the above-described embodiments, and in which the at least one source of light has a predetermined wavelength of emission, and wherein the display surface is formed of a material generally opaque to the light and having a high reflectivity at the predetermined wavelength.

There is also provided in accordance with further preferred embodiments of the present invention, an internally illuminated sign according to any of the above-described embodiments, and also comprising at least one rechargeable battery for powering the at least one source of light. Such a sign may also preferably comprise at least one solar cell for recharging the rechargeable battery.

In any of the above-described internally illuminated signs, the at least one source of light may preferably be disposed at an end of the display screen, or there may be at least two sources of light disposed in the central region of the display screen, at least two of the at least two sources pointing in essentially opposite directions, such that the sign is double-ended.

In accordance with yet another preferred embodiment of the present invention, there is also provided a method of improving the uniformity of illumination on the display surface of an internally illuminated sign, comprising the steps of providing at least one source of light for illuminating the display surface, and providing a curved contour to the display surface, the curved contour being such that light from the at least one source illuminating parts of the display surface closer to the at least one source, impinges at a more glancing angle than that of light illuminating parts of the display surface further from the at least one source. In this preferred method, the curved contour is preferably shaped such that variations in the luminous flux per unit area of the light impinging on the display surface, as a function of the distance of the point of impingement from the at least one source is reduced compared with variations in the luminous flux per unit area impinging on a flat display surface. Alternatively and preferably, the curved contour is shaped such that the luminous flux per unit area of the light impinging on the display surface is essentially uniform over the display surface or is shaped such that the luminous flux per unit area of the light impinging on the display surface is essentially independent of the distance of the point of impingement from the at least one source.

According to any of the last mentioned methods, the curved contour is preferably determined by a method comprising the steps of:

(i) dividing the display surface up into areas according to the distance of the areas from the source,
(ii) determining the illumination falling on a first predefined area of the display surface as a function of the distance of the predefined area from the at least one source and the angular orientation of the predefined area relative to the direction to the at least one source,
(iii) determining the distance of a second predefined area of the display surface from the at least one source, and
(iv) calculating the angular orientation required of the second predefined area of the screen such that the first and the second predefined areas of the screen receive essentially the same illumination.

There is further provided in accordance with yet another preferred embodiment of the present invention, an electronic system for use in a solar charged, battery operated, illuminated sign, comprising:

(i) a solar panel providing a output in accordance with the solar illumination incident thereon,
(ii) at least one light source for illuminating the sign,
(iii) at least one battery charged by the output, for supplying current to the at least one light source, the at least one battery providing a voltage dependent on the state of the charge of the at least one battery, and
(iv) a controller programmed to control the current at least in accordance with the voltage, such that the current is reduced when the voltage falls below a first predetermined level. In such a system, the current is preferably reduced to a level dependent on the level of the voltage below the first predetermined level, and even more preferably, this reduction of the current is operative to adapt the illumination of the sign in accordance with the past level of the solar illumination.

In the above-described electronic systems, the reduction of the current is preferably operative to adapt the illumination of the sign in accordance with the charge capacity of the at least one battery.

According to another preferred embodiment, the controller is also programmed to pass the current in an intermittent mode when the voltage falls below a second predetermined level. This intermittent mode preferably causes the light source to operate in a blinking mode when the voltage falls below this second predetermined level. The blinking mode is also preferably operative to indicate that the at least one battery requires replacement.

In accordance with still another preferred embodiment of the present invention, there is also provided a multi-unit, battery powered illuminated sign, comprising at least two separate illuminated sign units connected together, each of the separate sign units being powered by its own internal battery, and wherein the at least two separate sign units are connected such that the internal batteries of the at least two separate sign units are connected in parallel. This multi-unit, battery powered illuminated sign, may also preferably comprise at least one mechanical connection element which connects two adjacent ones of the at least two separate sign units, the at least one mechanical connection element preferably comprising an electrical connection for connecting in parallel the internal batteries of the two adjacent ones of the at least two separate sign units.

BRIEF DESCRIPTION OF THE DRAWINGS

The present invention will be understood and appreciated more fully from the following detailed description, taken in conjunction with the drawings in which:

FIG. 4A showing the sign card from the front, and FIG. 4B showing the sign card from the rear;

FIG. 14C shows the resulting composite house number;

DETAILED DESCRIPTION OF PREFERRED EMBODIMENTS

Figure 1A:
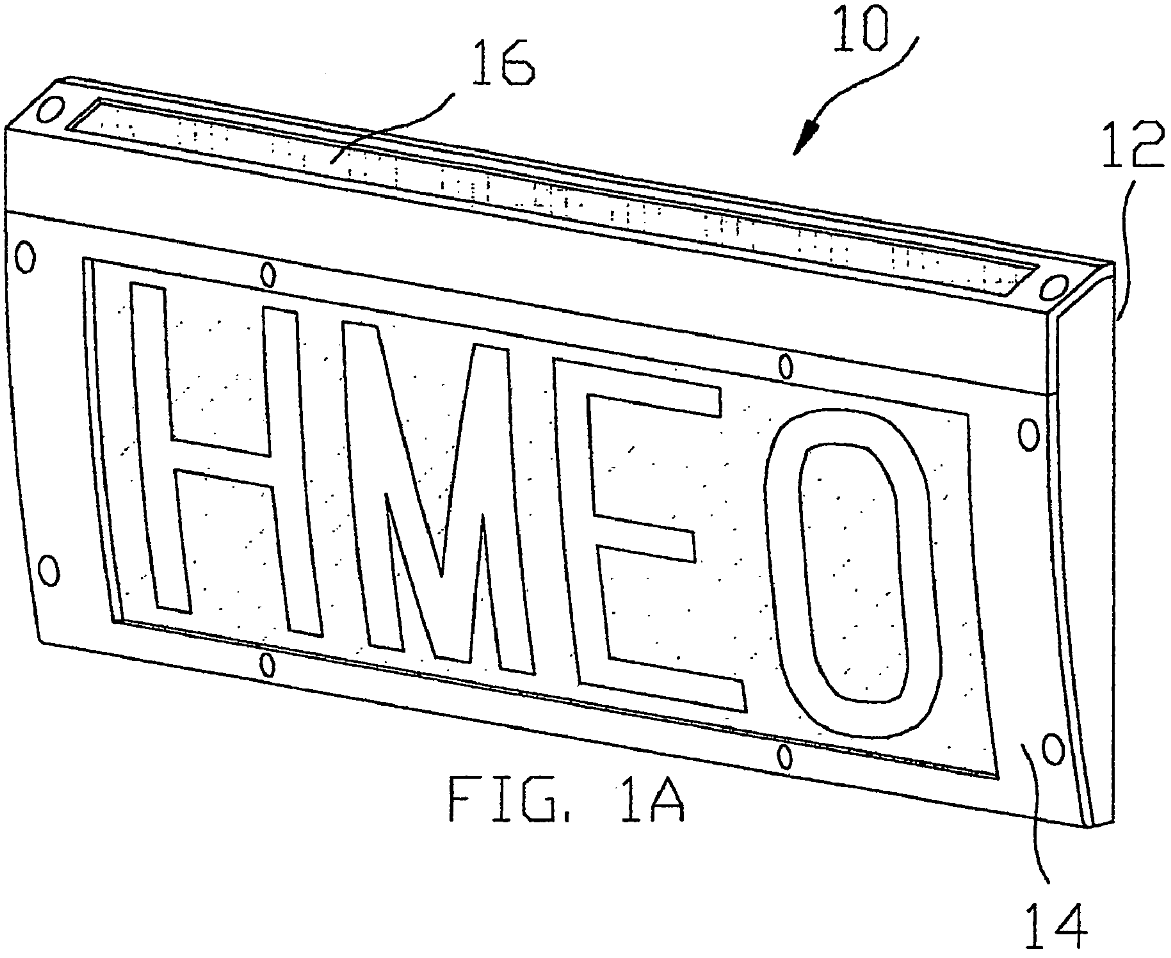
FIGS. 1A and 1B are isometric schematic views of a solar-powered, internally illuminated single-sided, respectively multiple and single character signs, constructed and operative according to a first preferred embodiment of the present invention.
Figure 1B:
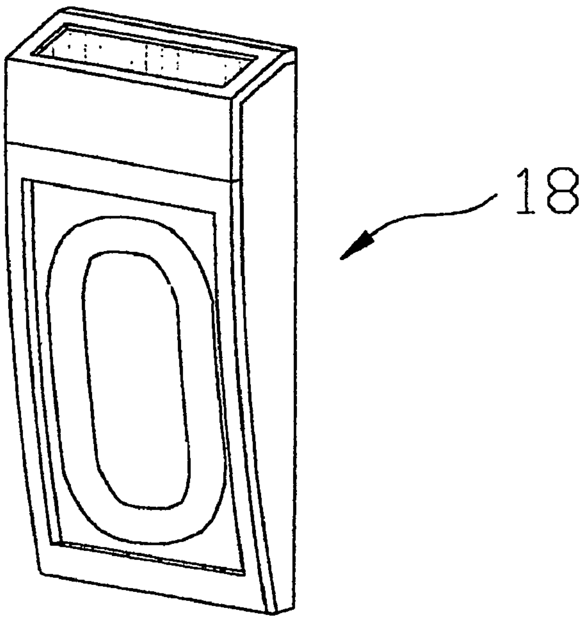

Reference is now made to FIG. 1A, which is an isometric schematic view of a solar-powered, internally illuminated, single-sided, multiple character sign 10, constructed and operative according to a first preferred embodiment of the present invention. The body of the sign preferably has a flat rear surface 12 for mounting of the sign on a wall, and a convex curved front surface 14, displaying the sign character or characters. When the sign is to be solar powered with an internal rechargeable battery, a solar panel 16 may be disposed, preferably at the top part of the sign 10, such that it faces the general direction of ambient incident light. FIG. 1B shows a single digit sign 18, constructed in a similar way to the multi-digit sign of FIG. 1A, to illustrate how a sign of any size may be built up of individual digit signs.

Figure 2:
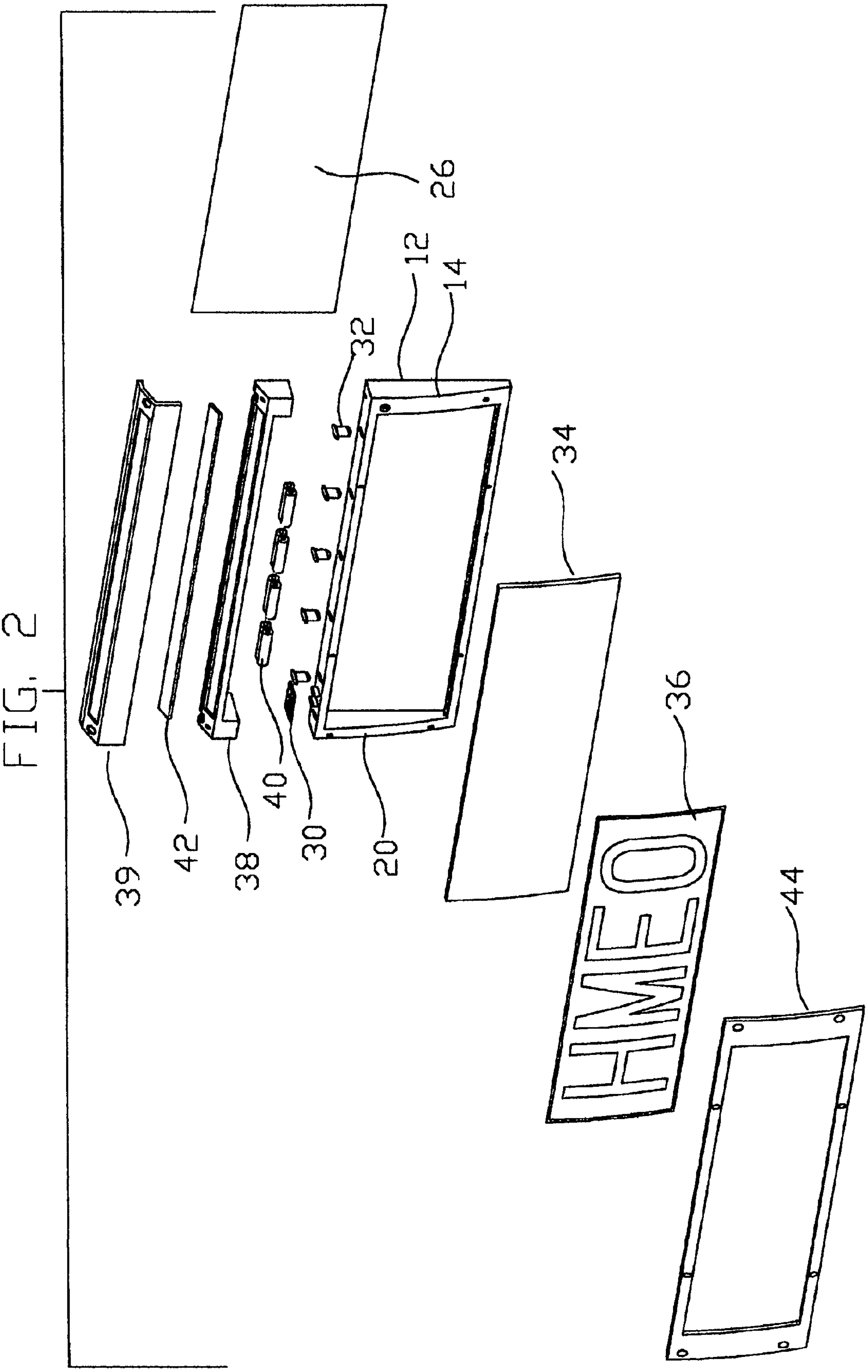
FIG. 2 is an exploded, isometric view of the sign of FIG. 1A, showing internal parts and a preferred construction.

Reference is now made to FIG. 2, which is an exploded, isometric view of an internally illuminated sign, similar to that shown in FIG. 1, showing the internal parts and preferred construction of the sign. The sign of the embodiment of FIG. 2 shows a multi-character single panel sign. The frame body 20 of the sign is preferably shaped with a flat rear surface 12, such as for mounting on a wall, and a convex curved front surface section 14, for supporting the character panel 36 of the sign. The rear of the panel is preferably closed with a sheet having a high reflectivity inner surface 26.

At the top end of the light box, a series of LED's 32 are mounted across the width of the sign, in such positions that the emitted light is directed down the length of the light box, i.e. from top to bottom in the preferred example shown in FIG. 2. Mounting of the light sources at the top of the sign is generally more advantageous than at other sides of the sign, as such signs are generally mounted above eye level, and the downward direction of light may assist visibility to the viewer's eyes, as will be further explained hereinbelow.

On the front of the light box is mounted a convex curved light diffusion plate 34, having a profile matching that of the front curved profile of the body. In at least this respect, the illuminated sign of the present invention differs from that described in WO 03/010738, and other prior art signs, where the plastic front screen supporting the character is flat. The use of a curved diffusive plate plays an important part in ensuring as uniform an illumination as possible, as will be expounded further hereinbelow.

The diffusion plate 34 is preferably made of a diffusive plastic sheet having a neutral white color. The use of a diffusive plate 34 makes the reflectivity of the internal surface 26 of the sign far less critical than in the prior art, where transparent front sheets may have been used. Furthermore, according to another preferred embodiment of the present invention, the LED emission is directed onto the screen, thereby providing advantages in terms of light utilization as compared to prior art signs, such as that described in WO 03/010738, where, in order to achieve uniformity of illumination, the light is directed onto the other walls of the light box, from where it is scattered onto the screen.

On top of the diffusion plate is mounted a display card 36 bearing a character or characters or graphic representation to be displayed, having a high reflectivity rear surface, preferably a specularly reflective surface, thereby increasing illumination efficiency. A preferred construction method of the card, and its associated advantages over the prior art is described hereinbelow. At the top end of the sign, a solar conversion cell 42 is preferably installed, which charges a set of rechargeable batteries 40 by means of charging circuitry 30. The solar panel is preferably enclosed by means of an outer frame 38 and cover 39. The front of the sign is preferably closed by means of a front frame 44, which encases the character card 36 and the remainder of the sign in a suitable functional yet decorative manner.

Alternatively and preferably, in place of a diffusive plate 34, the plate beneath the display card 36 can be made of a transparent material, and the display card 36 itself of a diffusive material. The effect on the operation of the sign should be essentially the same, so long as the support plate/display card combination is generally diffusive. For the remainder of this application and as claimed, a diffusive plate embodiment is assumed, though it is to be understood that the invention is equally effective using a clear support plate with a diffusive display card. Additionally, according to a further preferred embodiment, a single plate with the characters formed directly on the plate could be used, though such an option would be less flexible to produce than an embodiment having a separate display card and backing plate. The fact that the light source is disposed above the screen and the sign is, in most applications, located above the observer, allows attainment of higher light efficiency, because of the need to use less Lambertian diffusion, thus directing more of the light to the observer without losing light going in other directions. According to a further preferred embodiment of the present invention, by using a screen which is not 100% diffusive, light can be preferably directed in the direction of the observer, thereby increasing the illumination efficiency even more.

Figure 3:
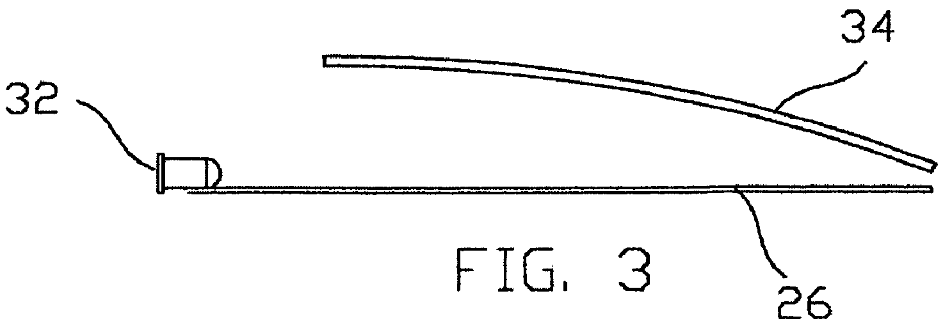
FIG. 3 illustrates schematically a cross section of the sign of FIG. 2, showing the optical internal structure.

Reference is now made to FIG. 3, which illustrates schematically a cross section of the signs of FIGS. 1A/B, showing the optical internal structure. The LED sources 32 direct their illumination down the length of the sign, with the light path reflected between the reflective inner surface 26 of the rear panel, and the convex curved light diffusion plate 34 carrying the sign format to be illuminated. Though the LED's in FIG. 3 is shown aligned parallel to the rear panel 26, they can preferably be aligned at a small angle to the rear plate, slightly towards the curved diffusion plate 34.

Figure 4A:
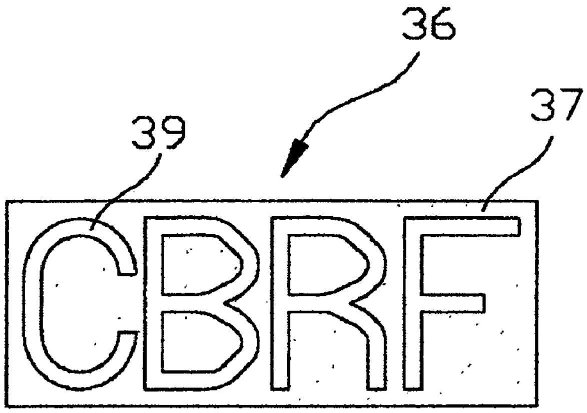
FIGS. 4A and 4B illustrate schematically the appearance of the characters of the sign of the embodiments of FIGS. 1 and 2.
Figure 4B:
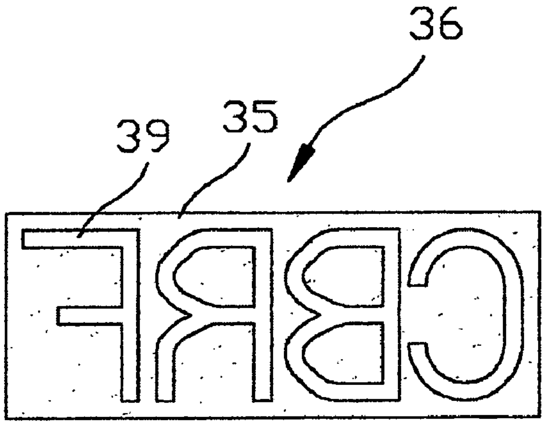

Reference is now made to FIGS. 4A and 4B which illustrate schematically the preferable appearance of the characters of the sign card 36. FIG. 4A shows the sign card from the front, showing the characters outlined in an optically opaque coating 37, with the characters themselves 39 being generated by the translucent diffusive material of the character card base material. FIG. 4B shows the sign card 36 from the rear, showing how the back side of the opaque regions between the characters is preferably constructed of a highly specularly reflective surface 35.

A major problem to be efficiently solved in the construction of the character card is how to more effectively utilize the light incident on the back of the character card, since in characters having typically used fonts, only about 10 to 15% of the surface area of the card is occupied by the transparent character itself, which allows the illumination out to the viewer, and the remainder of the light falls on the opaque regions of the character card, and is reflected back into the light box. Thus, the efficiency of this reflective process has a direct and crucial effect on the overall luminous efficiency of the sign. In the prior art illuminated sign described in WO 03/010738, the rear of the opaque areas of the card are described as being coated either with a reflective diffusive material, such as 3M Light Enhancement Film (LEF), which is known to have a reflection of the order of 92% in the visible, or with a high reflective printed layer. However, the LEF layer cannot be easily fabricated other than by punching, or by cutting out the shapes, which is a comparatively expensive process. In the preferred embodiments described in FIG. 4 of WO 03/010738, the high reflective printed layer is described as being a white opaque film which is applied by means of silk screen printing, with a blocking region printed on top of it. In this respect, the construction and efficiency of the character screen shown in WO 03/010738 could have been achieved more simply by use of a single layer of the above mentioned 3M blocking film, which also has a blocking top with a white, diffusively reflective back surface. Furthermore, use of such a ready-made blocking film would provide better optical performance, since the 3M blocking film, for instance, has a higher reflectivity than most white printed layers. Such a white printed layer is a diffusive reflector, but the reflectivity is significantly less than that of a high reflectivity layer, and is typically only of the order of 65% to 75%, compared with about 95% for a highly reflective aluminium film. The reflection in such prior art signs, is therefore lossy. Furthermore, two silk screen printing steps are required to produce the character card, and such a two step process involves waiting for the first layer to dry before performing the second printing step, or the use of heating between steps, with the incumbent danger of character shrinkage or distortion. Furthermore, the layers must overlap accurately to avoid undesired aesthetic blemishes to the sign.

Figure 5:
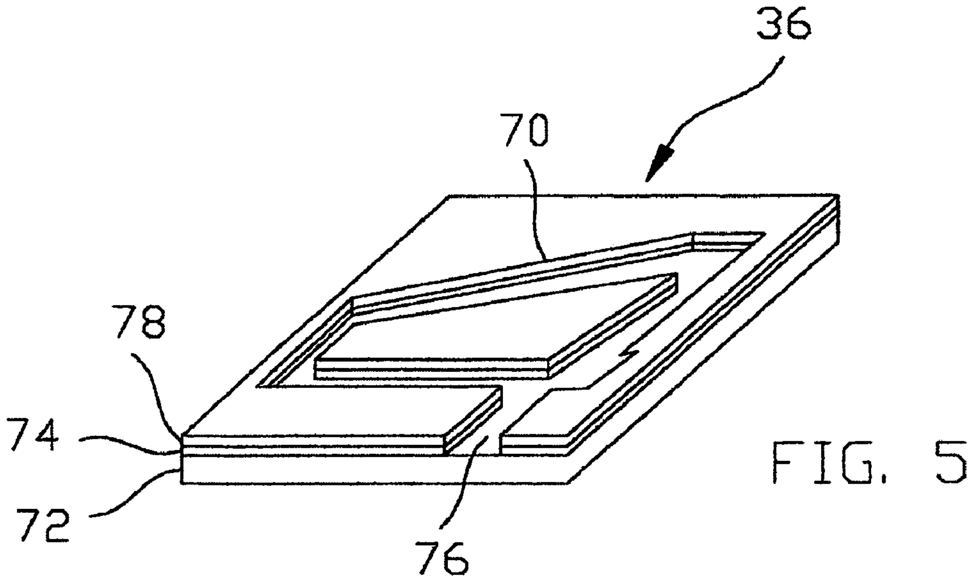
FIG. 5 illustrates, according to a further preferred embodiment of the present invention, a preferred structure of the character card bearing a character to be displayed.

Reference is now made to FIG. 5, which illustrates, according to a further preferred embodiment of the present invention, a preferred structure of the character card 36, bearing a character to be displayed 70. The character card 36 is shown in cross section, to show a preferred method of construction using a metallic coated plastic film 72, such as aluminum-coated mylar. Such films can be obtained in a wide range of thicknesses, and the aluminum coating 74 thereon is highly and specularly reflective, typically of the order of at least 92% across the visible spectral range, resulting in a lower loss light than in the reflective surfaces typically used in prior art signs. The clear character region 76 can then preferably be produced by etching away the aluminum 74, leaving the clear mylar foil 72 for transmitting the light through the character. This etching process is preferably performed by first silk screen printing the opaque regions of the character card with an opaque ink or paint 78, and then etching away the aluminum using those printed regions as the protective layer for the aluminum during the etching process. Thus, with a single printing step, the character can be prepared both for etching and for providing the character opacity. This silk screen printed layer may thus also be operative to ensure that the reflective layer is not visible from the outside of the sign.

According to another preferred embodiment of the present invention, a mylar film may preferably be used, having a layer of aluminum which is highly reflective on one side, which will be used as the interior of the sign, and a diffusive finish on the other side, which would face the outside of the sign, thus obviating the need for an additional ink or paint layer. In this preferred embodiment, the single aluminum layer plays the double role of blocking and reflecting.

According to another preferred embodiment of the present invention, the character card is constructed on a clear plastic film 72, without any reflective metallic layer at all, and the opaque ink or paint 78 is selected to be of such a color that it has a spectrally selective high reflectivity at essentially the same wavelength as the emission from the LED source. As a result, during the day, the paint is visible in its natural color, and during the night, when the internal illumination is operable, the ink or paint layer appears dark from the outside. However, the reflection of the LED light emission from the backside of the ink or paint layer 78 is high because of the spectral properties of the layer 78, and strong illumination is thus visible from the outside through the character card. This layer can preferably be printed either on the outside of the character card, as shown in the embodiment of FIG. 5, or on the inside.

Figure 6:
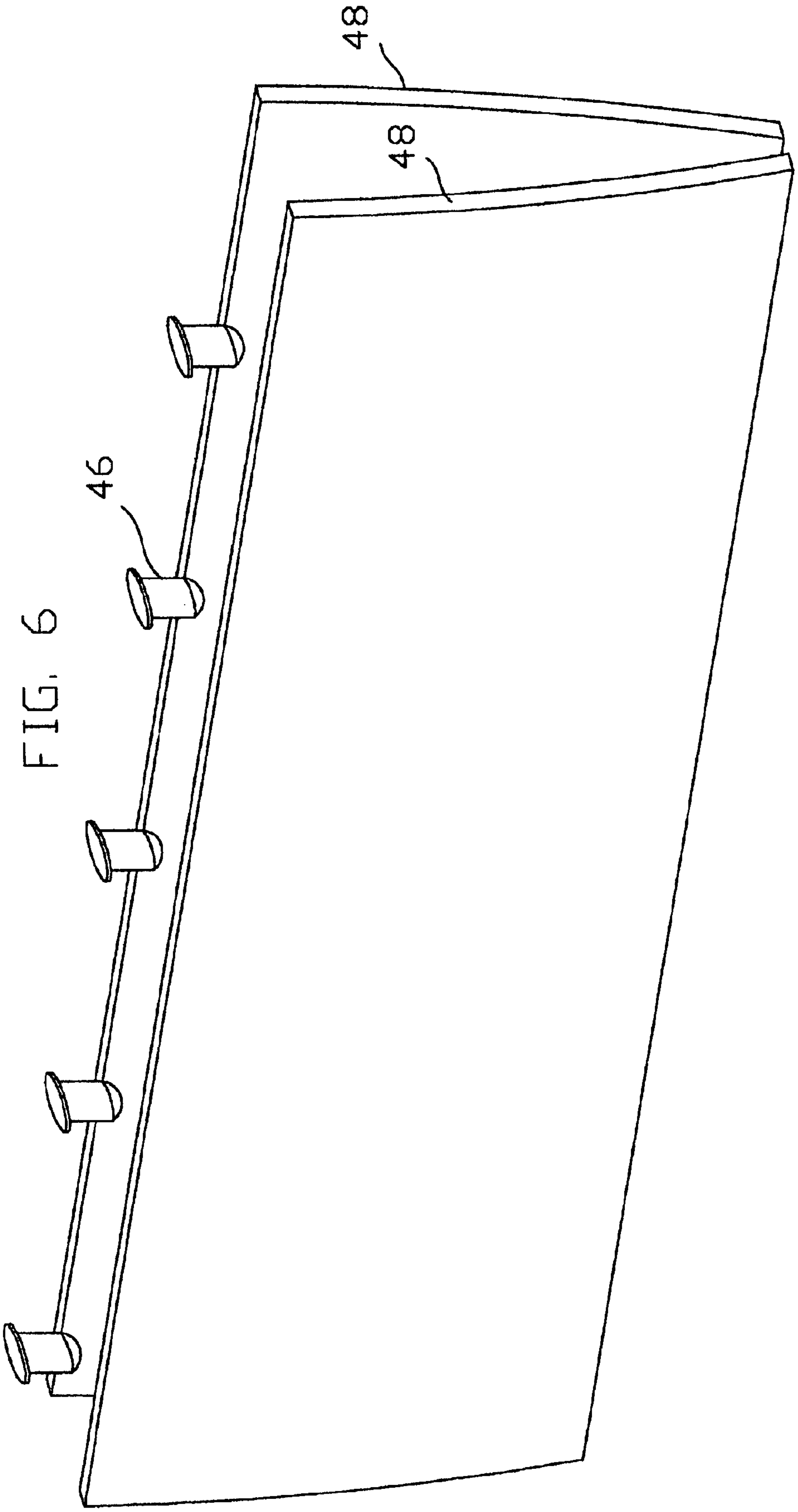
FIG. 6 illustrates schematically the optical propagation structure of a double sided display sign, constructed and operative according to a further preferred embodiment of the present invention.
Figure 7C:
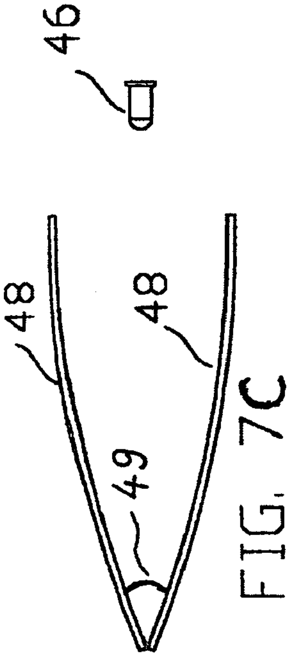
FIG. 7C also depicts a schematic cross section of a double ended sign according to a further preferred embodiment of the invention.
Figure 7A:
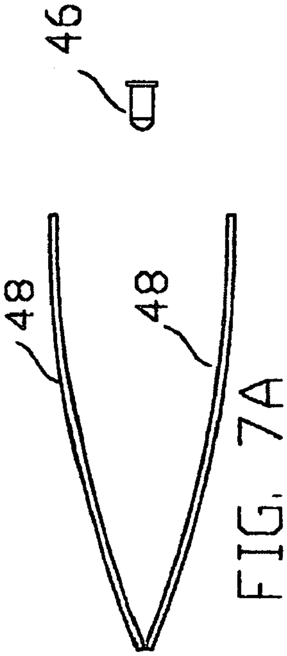
FIG. 7A is a schematic cross section of the double-sided sign of FIG. 6
Figure 7B:
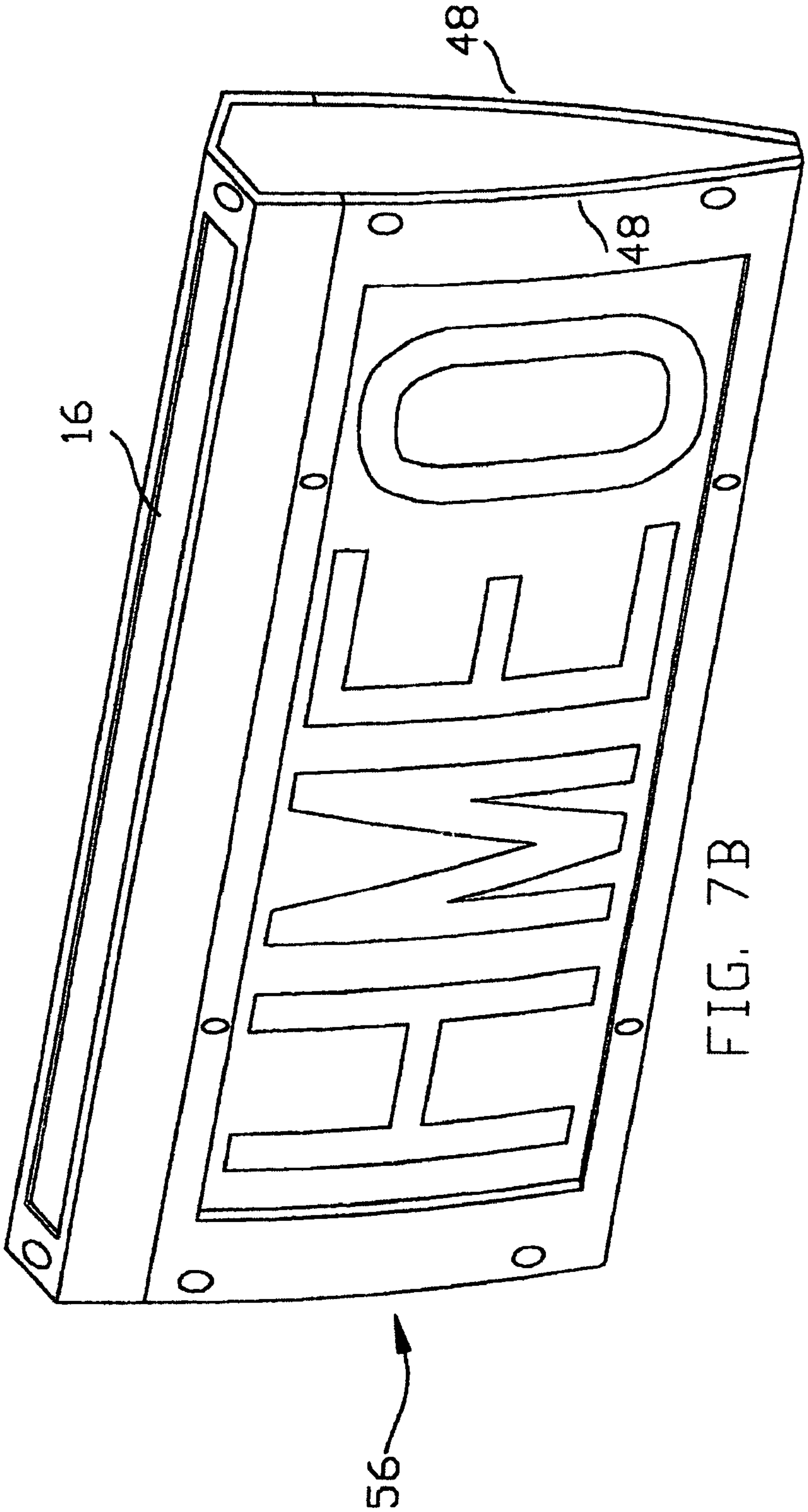
FIG. 7B is a schematic illustration of a complete double-sided sign, constructed using the preferred optical structure shown in FIGS. 6 and 7A.

Reference is now made to FIG. 6, which illustrates schematically the optical propagation structure of a double sided display sign, constructed and operative according to a further preferred embodiment of the present invention. Such an embodiment could be used as an advertising sign, or as a street sign or the like. The sign utilizes a row of LED sources 46 directing their light onto two oppositely directed curved diffusive plates 48, on which is applied, either directly or by means of a separate character card, the display sign or picture to be illuminated. As in the previously shown embodiments of the single sided sign of FIGS. 1A/B and 2, the rear of the opaque regions of the characters of the display sign or of the graphic representation, are preferably made to be highly reflective, such that reflection of light between these rear sides provides the light mixing effect which, in the previously shown preferred embodiments is provided by the rear reflective surface of the sign and the back of the opaque regions of the character card. FIG. 7A is a schematic cross section of the double-sided sign of FIG. 6, while FIG. 7B is a schematic illustration of a complete double-sided sign 56, constructed according using the optical structure shown in FIGS. 6 and 7A. The sign may preferably be powered by an internal battery charged by means of a solar cell 16. Reference is now made to FIG. 7C, which is a schematic cross section of a further preferred embodiment of the present invention, similar to that of FIG. 7A but including a convex reflective surface 49 disposed between the curved diffusive plates 48. This additional convex reflective surface is operative to increase the amount of light reflected from the vertex of the sign, as compared with the embodiment of FIG. 7A, and to spread the light out more uniformly over the inside of the sign. Since the vertex of the sign is generally covered by the frame, no loss of display area is encountered by the presence of the convex reflector.

Figure 8A:
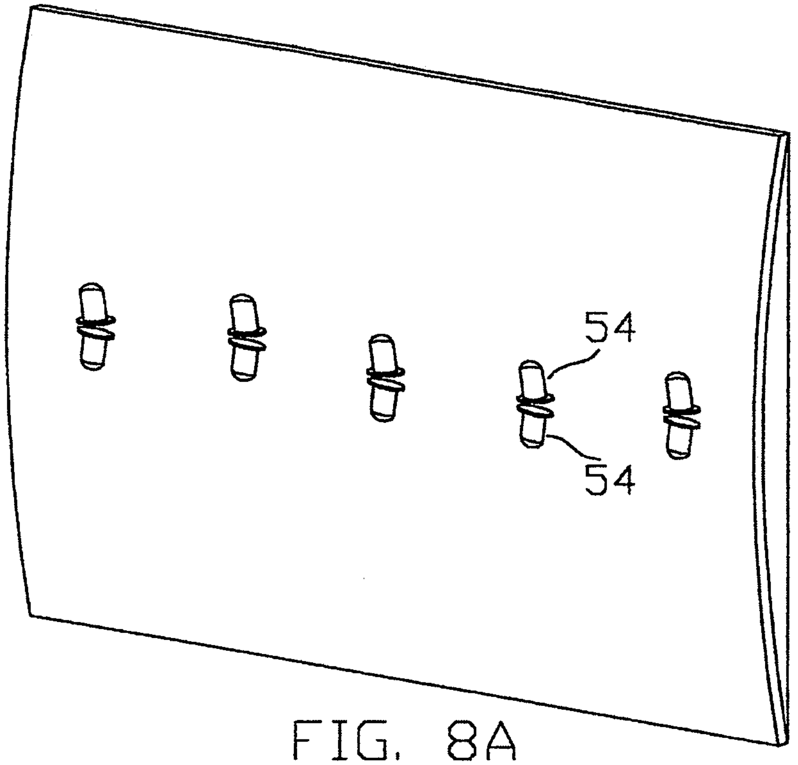
FIGS. 8A to 8D are examples of double ended signs, with the illuminating LED's located at the center of the signs.
Figure 8B:
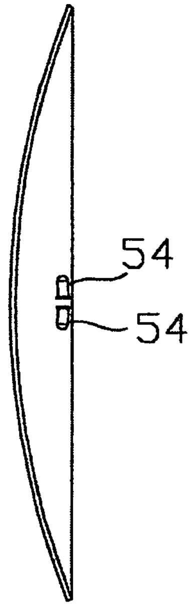

Reference is now made to FIGS. 8A to 8D, which are schematic illustrations of further curved display screen signs, constructed according to more preferred embodiments of the present invention. These embodiments show how it is possible to locate the illuminating LED's at the center of a double ended sign, with two sets of LED's, one directed towards each end of the sign. FIG. 8A shows a single-sided, double-ended sign with the LED's 54 pointing towards the curved display screen at a slight angle to the length axis of the sign, in order to illuminate the center of each end of the curved display screen. The cross section of this embodiment is shown in FIG. 8B.

Figure 8C:
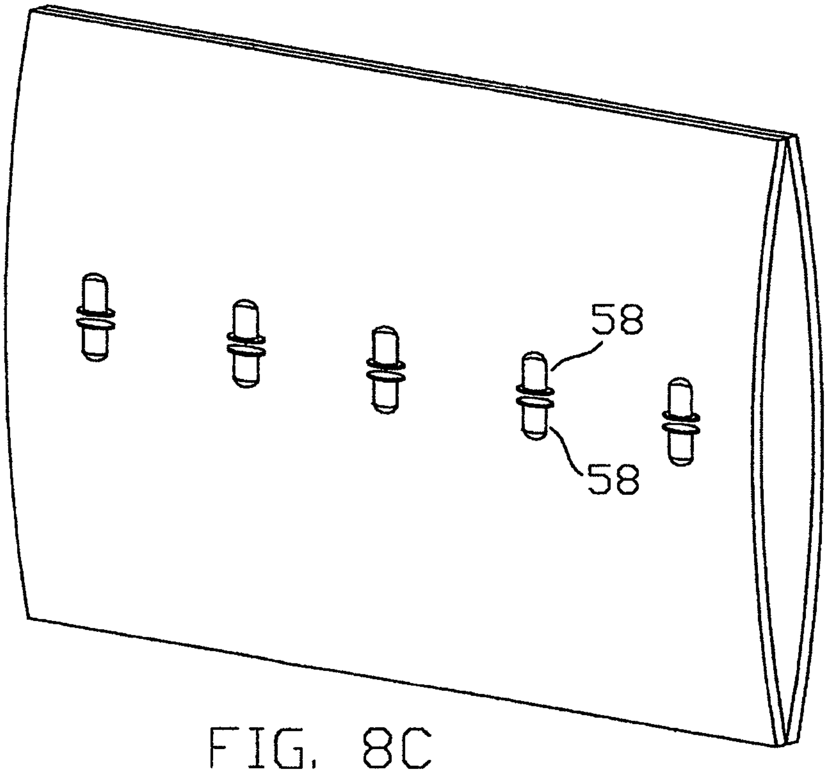
Figure 8D:
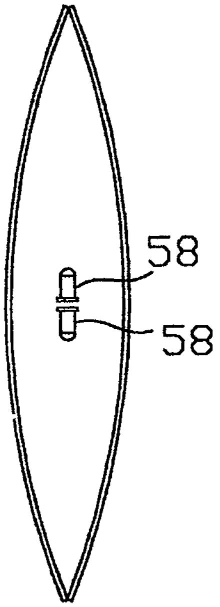

FIG. 8C shows a double-sided, double-ended sign with the LED's 58 pointing towards the curved display screen along the length axis of the sign, in order to illuminate the curved display screens on both sides of the sign. The cross section of this embodiment is shown in FIG. 8D.

Figure 9B:
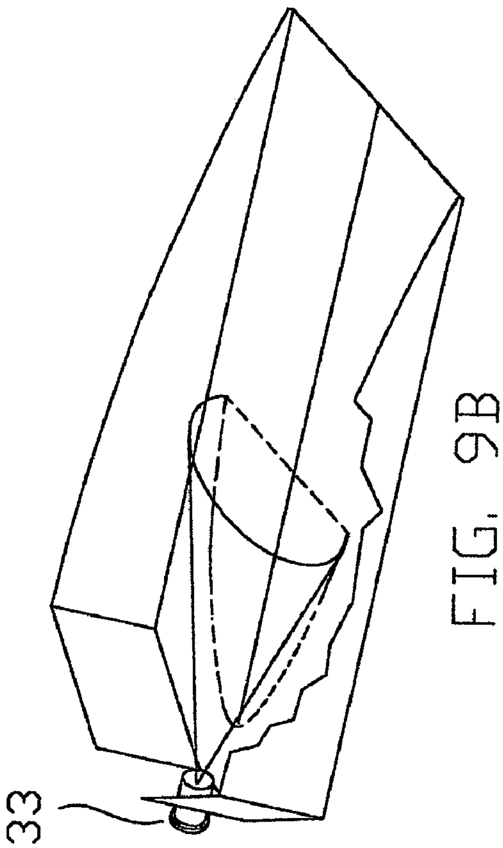
FIGS. 9A and 9B illustrate the use, according to a further preferred embodiment of the present invention, of a LED source having a high aspect ratio beam profile for use in the signs of the previous embodiments.
Figure 9A:
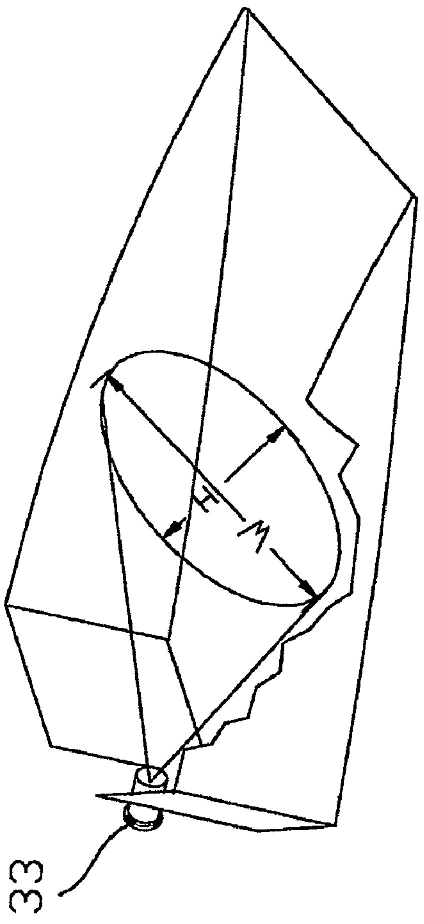

Reference is now made to FIGS. 9A and 9B, which illustrate the use, according to a further preferred embodiment of the present invention, of a LED source 33 having a high aspect ratio beam profile. Since, in the previously shown embodiments of the signs of the present invention, the width of the region of the sign in which the light propagates is significantly larger than the height between its reflective surfaces, use of a standard LED source having a uniform circular beam profile, as in prior art illuminated signs, would lead to a marked lack of incident illumination uniformity across the width of the character plate. The multiple reflections within the light box can only even out this lack of uniformity to a limited extent. Furthermore, the illumination efficiency is reduced since a disproportionate percentage of the light is directed upwards and downwards, where it has to undergo loss-inducing reflections. It should be noted that the reflectivity of the diffusively reflective layers used in the prior art for the undersides of the character plates is only of the order of 65% to 75%, the rest of the light being lost by absorption or transmission. Thus for multiple reflections, the loss may become noticeable. According to this preferred embodiment of the present invention, a LED is selected having an emitted beam width significantly larger than the beam height, so that at any cross section of the beam, the ratio W/H is more adapted to the dimensions of the light propagation volume of the signs, whether double sided, as shown in FIG. 9A or single sided, as shown in FIG. 9B.

The above-described preferred embodiments of the self-illuminated signs of the present invention incorporate a number of features, which impart such signs with improved properties over illuminated signs described in the prior art. These features, and the way in which they operate and are designed to provide the achieved effects, are described more fully hereinbelow.

Figure 10:
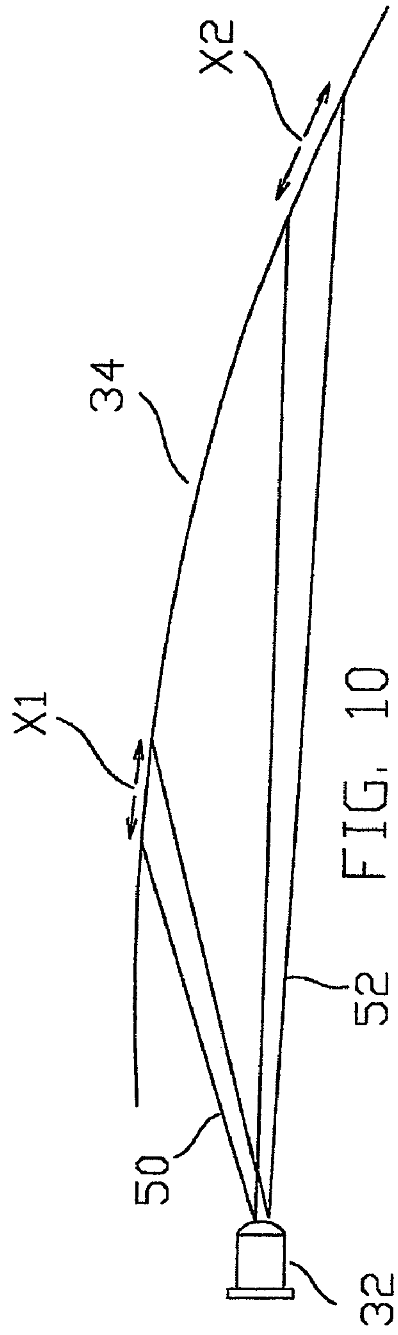
FIG. 10 is a schematic illustration, according to a further preferred embodiment of the present invention, of the use of a curved diffusive screen onto which the LED source directs its light, in order to provide uniform illumination down the length of the screen.

One of the disadvantages of prior art signs with an illuminating source at one end of the sign screen is that the illumination falls off with distance from the source. Reference is now made to FIG. 10, which illustrates schematically, according to a further preferred embodiment of the present invention, the use of a curved diffusive screen 34, onto which the LED source 32 directs its light, in order to provide uniform illumination down the length of the screen. In FIG. 10 are shown two representative segments of the beam emitted at different angles by the LED 32. Each of the representative angular segments of the beam is shown as a slightly divergent beamlet, and each has a uniformly equal angular distribution of light, which is a reasonable approximation for a directive LED source for beamlets not too far off-axis. The upper beamlet 50, impinges on the diffusive plate closer to the LED source than the lower beamlet 52. Since the illumination falls off as the distance from the LED source increases, if the screen were flat, as in prior art illuminating screens, the illumination would fall off with distance from the LED simply because of geometric considerations of the beam fan-out. In order to compensate for this geometric fall-off in illumination, and to provide uniform illumination, it is necessary to arrange that each unit area of screen, which for a fixed screen width means unit length of screen, receives the same amount of light regardless of distance from the source. This is achieved by the use of the curved screen 34 of the present invention. The light from upper beamlet 50 falls on the screen at an angle such that a length X1 of the diffusive screen is illuminated. The light of the lower beamlet 52, impinges on the diffusive screen, because of its curvature, at an angle closer to normal incidence than that of beamlet 50, such that a length X2 of the diffusive plate is illuminated. X2 is shorter than the distance which would have been illuminated by the beamlet 52 if the screen were flat, such as in prior art screens. For equal illumination on both parts of the screen, the curvature of the screen must be arranged such that the length X2 is equal to the length X1, despite the further distance of X2 from the source, and the concomitant wider geometric divergence of the beam and its reduced illumination. Use of the curvature of the diffusive screen of the present invention thus provides a compensating angular effect for the effect of the reduced beamlet illumination arising from the increased distance from the source. Correct calculation of the shape of the curved screen can provide compensation such that the illumination on the screen is significantly more uniform than in prior art flat screens.

In practice, the model described above is made somewhat more complex because of the effect of reflections of the propagating beamlets from the back plate of the sign in the case of the single sided embodiments of FIGS. 1-3, or from the reflective backs of the signs on the opposite sides, in the case of the double-sided embodiments of FIGS. 6-8. In general, however, the curved diffusive plate still generates a desired improvement in illumination uniformity compared with prior art diffusive plates with flat surfaces, which show no such compensating effect. Furthermore, the use of the curved screen with a highly specularly reflective backing utilizes a much more direct form of illumination than the prior art flat screens, with minimal reliance on reflection from the internal surfaces. For some applications, this direct illumination is so effective that satisfactory sign performance can be obtained even without a reflective back side of the front panel.

Figure 11:
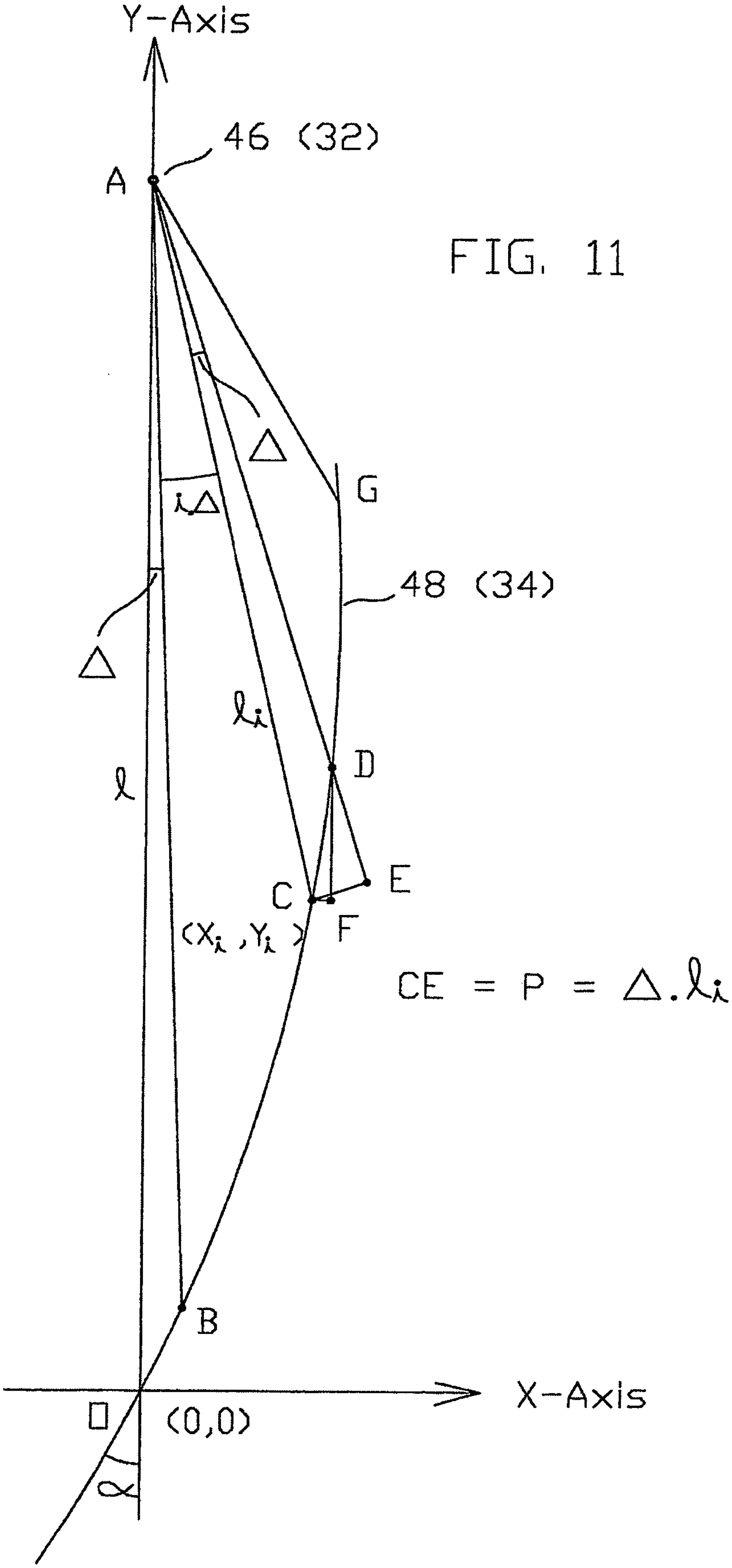
FIG. 11 shows the screen of FIG. 10, showing the geometric nomenclature used to illustrate the derivation of an iterative method for calculation of the shape of the curved diffuser screen to provide optimum uniformity of illumination over the length of the screen, according to a further preferred embodiment of the present invention.

Reference is now made to FIG. 11, which illustrates schematically a cross section of the sign whose optical surfaces are shown in FIG. 3, showing the curved diffusive sign screen 34 and one of the illuminating LED sources 32 thereof. The curved sign screen could alternatively and preferably be one side of the double-sided embodiment of FIG. 7, in which case the illuminating source is the LED 46 and the screen is item 48. FIG. 11 will be used to illustrate the derivation of an iterative method for calculation of the shape of the curved diffuser screen to provide optimum uniformity of illumination over the length of the screen, according to a further preferred embodiment of the present invention. The following calculation is performed for one side of a two-sided sign, and only that one side is shown in FIG. 11. The other side is a mirror image of the side shown.

In FIG. 11, the following geometrical definitions are made:

- (0,0) is the origin for the x-y plane in which the geometrical illumination calculation is performed, and is set at the point of the screen furthest from the source 46.
- The light source 46 is located on the y-axis at a distance I from the origin.
- $\propto$ is the angle which the end of the screen makes with the y-axis at the origin.
- $\theta$ is the half angle of the illumination opening of the light source 46.
- $\Delta$ is the incremental angle of illumination, obtained by dividing the illumination half-angle $\theta$ into N equal segments.
- i is the segment number along the diffusive screen, the segment i having co-ordinates (xi, yi), and located at a distance Ii from the illumination source 46. The first segment is located at the origin, with i=0.

The object of the algorithm is to provide uniform illumination along the whole length of the screen. If it is assumed that the emitted beam has an approximately uniform flux over its angular output range, uniform illumination is achieved, by making each of the screen segments of equal length. However, as the segments get closer to the source, i.e. as $I_i$ becomes smaller, each incremental angle, $\Delta$, of illumination illuminates a shorter projected segment perpendicular to the beam. Therefore, in order to compensate for this increase in illumination with closeness to the source, the screen must be aligned at a smaller angle to the beam incident direction as the source is approached, in order to increase the length of illumination falling on the screen itself.

The iterative calculation of the shape of the screen, defined as a series of co-ordinates of successive points on the curved shape of the screen in the x-y plane, proceeds as follows:

For the segment, i, the projection, P, at the screen of the beam segment illumination perpendicular to the beam direction, assuming the small angle approximation for $\Delta$, is given by the expression:

$$P=\Delta\cdot 1_i \tag{1}$$

For the first segment, aligned at an angle $\propto$ to the y-axis, the length, Z, of the projection of P on the curve itself thus becomes:

$$Z=\Delta\cdot 1/\sin\propto \tag{2}$$

The object of the calculation is to ensure that every angular segment, $\Delta$, of the emitted beam illuminates the same length of segment of the screen, regardless of the value of Ii.

A full mathematical derivation of this calculation is given in Appendix A attached hereto. The result of the calculation is that the co-ordinates of the $(i+1)^{th}$ point along the screen curve, relative to the $i^{th}$ point are given by:

$$x_{i+1}=x_i+\Delta\cdot I/\sin\propto\cdot\cos\{\Delta(i+1)+\cos^{-1}(I_i\sin\propto/I)\} \tag{3}$$

$$y_{i+1}=y_i+\Delta\cdot I/\sin\propto\cdot\sin\{\Delta(i+1)+\cos^{-1}(I_i\sin\propto/I)\} \tag{4}$$

$$I_{i+1}=I_i-\Delta\cdot\{(I/\sin\propto)^2-I_i^2\}^{1/2} \tag{5}$$

Each successive segment is thus located at co-ordinates, as defined iteratively by equations (3) and (4), which provide uniform segment illumination along the diffusive screen curve.

Figure 12:
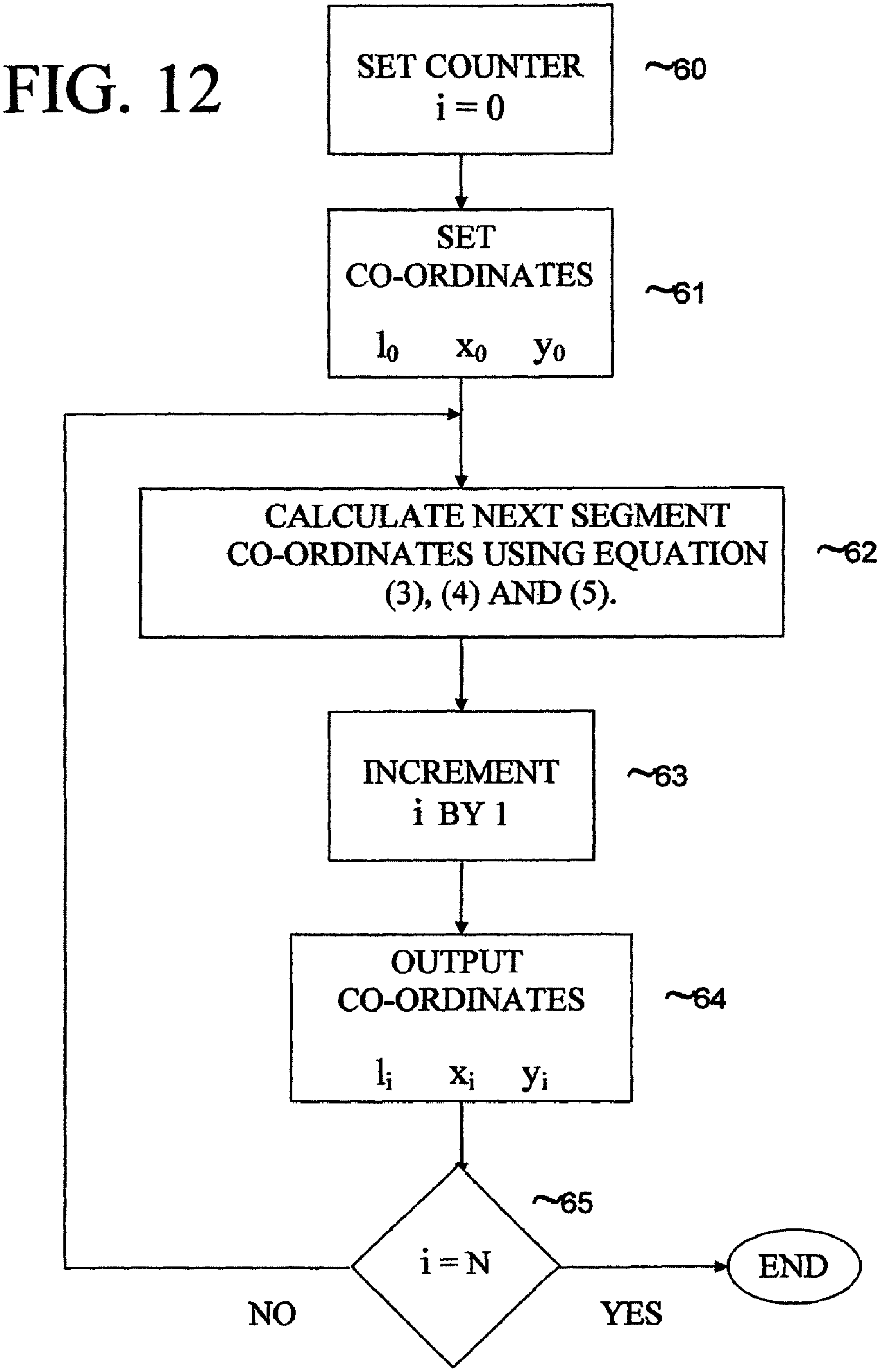
FIG. 12 is a block diagram, according to a further preferred embodiment of the present invention, illustrating the algorithm used in order to perform the iterative calculation of the shape of the curved diffuser screen of FIG. 11, to provide optimum uniformity of illumination over the length of the screen.

Reference is now made to FIG. 12, which is a block diagram, according to a further preferred embodiment of the present invention, illustrating the algorithm used in order to perform the iterative calculation of the shape of the curved diffuser screen of FIG. 11, to provide optimum uniformity of illumination over the length of the screen.

In step 60, the screen segment counter i is set at zero, and in step 61, the co-ordinates of the first segment of the screen, that furthest from the source, $x_0=0$, $y_0=0$, and its distance $I_0=L$ from the source are set.

In step 62, the co-ordinates of segment i+1 of the screen, $x_{i+1}$, $y_{i+1}$, and its distance $I_i$ from the source are calculated using the expression derived above in equations (3), (4) and (5).

In step 63, the segment is incremented by increasing the value of i by 1.

In step 64, the values of the co-ordinates of this next segment are output, and $x_i$, $y_i$ printed for the record.

In step 65, the algorithm determines whether the value of i has reached its final value N. If so, the program is ended with the co-ordinate values output so far. If not, then the algorithm returns to step 62, and calculates values of the next screen segment co-ordinates. This process is continued until the co-ordinates of the complete screen shape have been calculated, and the screen can then be manufactured according to those co-ordinates.

The above algorithm has been described for a source giving constant illumination intensity as a function of off-axis angle. If this were truly the case, the result of the above calculation would show the optimum curve to be a segment of a circle, with the source lying on the segment. Although this is a reasonable approximation for small off-axis angles, in practice, the LED intensity does vary with angle, and the relative weight of the intensity will change the calculated length of the segment by the inverse of the relative intensity in the specific direction. In the case of a single sided sign, the source can be pointed such that its axis hits the screen at, or close to, the mid-point of its length. Additionally, the angular span of the source illumination can be limited to provide more uniform illumination. Alternatively, the LED illumination span can be used to its full width in order to provide increased illumination at the expense of some uniformity.

The uniformly illuminated signs of the present invention may be used for a number of novel applications, wherever low power, uniform illumination is required. Although prior art, low power signs have been generally used in situations where there is no externally available power, and utilizing solar power to maintain the internal batteries charged, the signs of the present invention may also advantageously be used in emergency lighting situations, where the internal batteries are maintained charged by the mains supply. Only when the mains supply is cut off does the sign become operative. Because of the very low power consumption of such signs, they can be used powered by their own internal battery for long periods of time. For instance, a sign constructed according to the present invention, and having illumination such that it is clearly visible in the dark from a distance of tens of meters, has a power consumption of less than ten milliwatts. Such use for emergency lighting is thus very advantageous, whether land, air or sea based. Alternatively and preferably, such signs can be used in situations where a central emergency battery supply is available, such as in underground car parks. In such an application, a large number of signs can be fed by wiring from a central point at which a storage battery can be located. Because of the low power consumption of each sign, a battery no bigger than a car battery, can supply a very large number of such signs, sufficient to cover a parking lot of many hundreds of spaces, for many hours.

Figure 13A:
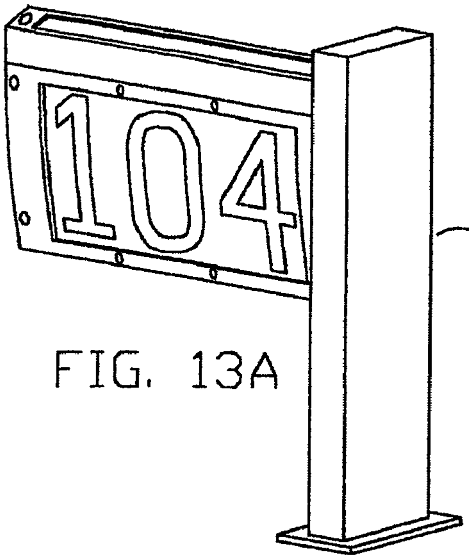
FIGS. 13A and 13B are schematic views of both sides of a milestone, constructed and operative according to various preferred embodiments of the present invention.
Figure 13B:
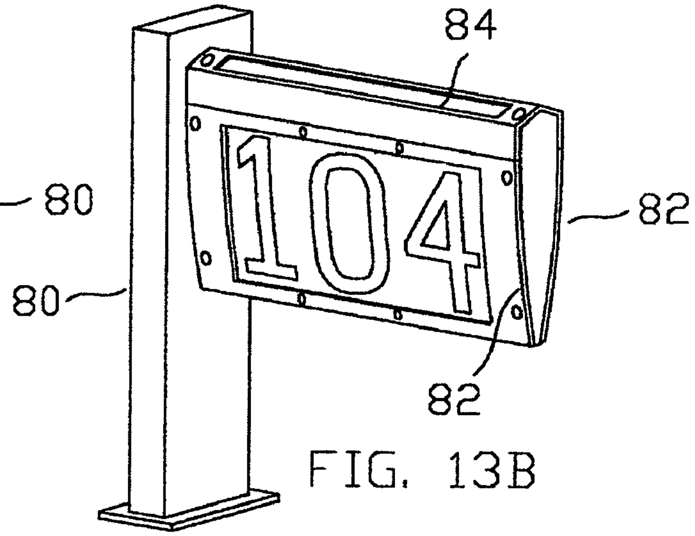

As an example of one of the above described applications, reference is now made to FIGS. 13A and 13B, which are schematic views of both sides of a milestone, 80, constructed and operative according to the various preferred, above-described embodiments of the present invention. The milestones are shown using the double-sided, curved display panels 82 described hereinabove, and are solar powered by means of solar collection cells 84 disposed in the top of the signs.

Figure 14A:
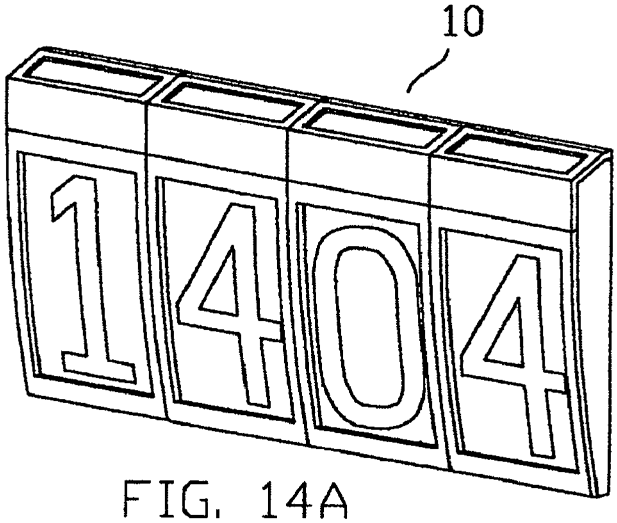
FIGS. 14A, 14B and 14C are schematic views of multi character signs for use as house numbers, constructed and operative according to further preferred embodiments of the present invention, FIG. 14A being a single unit, multi-character house number, FIG. 14B a single character house number for joining to the multi-character house number of FIG. 14A.
Figure 14B:
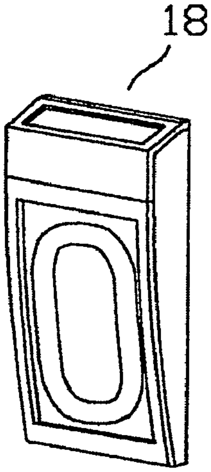
Figure 14C:
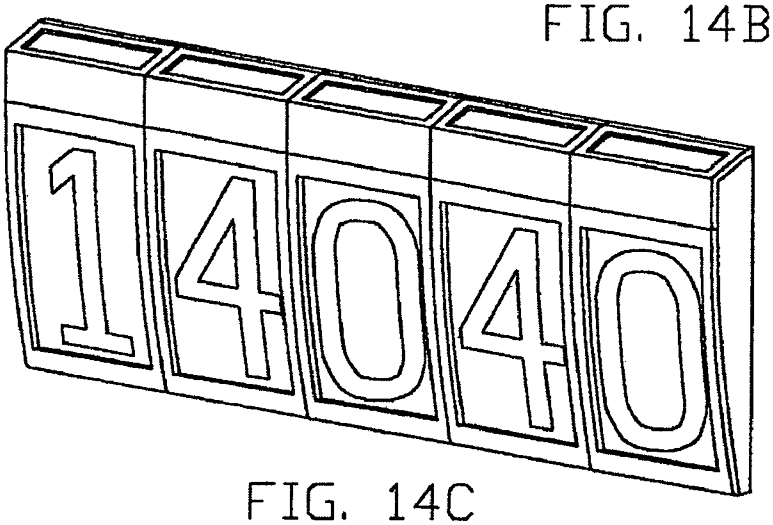

Reference is now made to FIGS. 14A to 14C which are schematic views of multi character signs for use as house numbers, constructed and operative according to further preferred embodiments of the present invention. In the example shown in FIG. 14A, a number of individual single character signs are shown joined together to create a multiple character sign, particularly useful, for instance, for generating house numbers from standard single-unit characters, such as that shown in FIG. 14B. It is to be understood, however, that this is but one preferred method of creating such a multi-character sign. According to another preferred embodiment of the present invention, the sign 10 shown in FIG. 14A could preferably be supplied as a single unit in multiple digit form, such that each digit looks like a single digit unit, but the whole four-digit sign contains only one set of electronics, batteries and solar cells. It thus becomes more economical to make flexibly sized signs. Thus, in the preferred embodiment shown in FIG. 14A, the multiple character sign 10, could be a four digit unit, with one set of internal electronics, but designed externally to resemble four individual units. Addition of a single unit, 18, FIG. 14B, to provide for example, a fifth digit, results in a more economical solution than five individual units, as in FIG. 14C, and in a more flexible solution than a single unit predetermined sign of five digits.

According to further preferred embodiments of the present invention, there are provided novel features and circuits relating to the power management of the batteries of internally illuminated solar-powered signs in general, which provide such signs with advantages over prior art illuminated signs. These features and circuits can be advantageously applied, whether to illuminated signs of the type described in the various embodiments of the present invention, or whether to those of prior art types.

Figure 15:
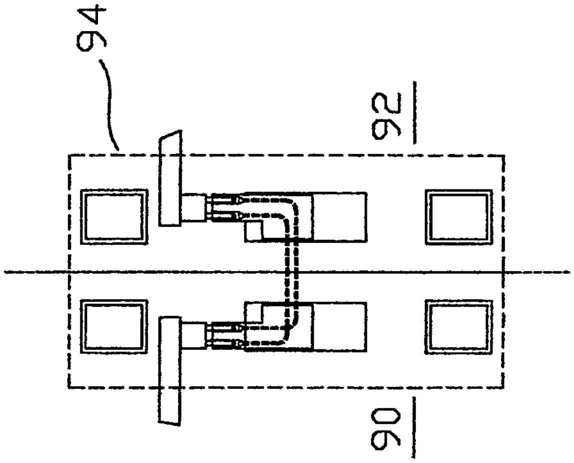
FIG. 15 shows schematically the manner of connecting in parallel the batteries of separate units of a composite house number sign of the type shown in FIGS. 14A to 14C, in order to increase service intervals for battery changing in solar-charged illuminated signs.

Reference is now made to FIG. 15, which shows schematically, according to another preferred embodiment of the present invention, the manner by which the batteries of separate units of a house number sign may be connected in parallel. In prior art units of the type where separate digit units are connected together to provide the complete sign, and a single set of batteries power each separate digit unit, then the need to service the sign occurs as soon as the first battery of any digit unit requires replacement. According to the preferred arrangement of the present invention, shown in FIG. 15, the separate digit units 90, 92, are provided with a connecting element 94 which preferably operates both as a mechanical and as an electrical connector between separate units, though the two functions may also be provided separately. The electrical connection is made such that the batteries of each separate digit unit or even multi-digit unit, are connected in parallel, such that all of the individual batteries of separate units back each other up. Service to replace batteries is not therefore required until all or most of the batteries of the individual units are at, or close to, the end of their life. Thus the advantages of a single large battery are available but without forgoing the modular method of building a sign from separate standard, self-powered, single-character units, each having its own battery unit.

Figure 16:
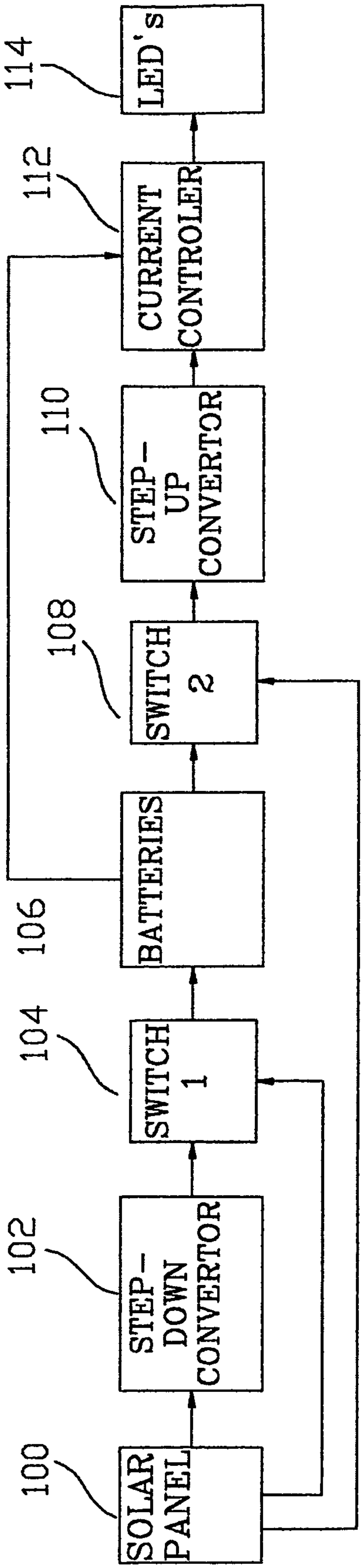
FIG. 16 is a schematic diagram showing a charging management system, according to another preferred embodiment of the present invention, for adjusting the output illumination of the sign according to solar illumination conditions and battery lifetime.

Reference is now made to FIG. 16, which is a schematic diagram showing a charging management system, according to another preferred embodiment of the present invention, which ensures that the output illumination of the sign adjusts itself to the available solar illumination conditions, and to the general condition of the battery unit. When solar illumination conditions on the solar panel are poor, whether because of the panel's installation position or location, such as when it is exposed only to daylight and not to direct solar radiation, or because solar illumination is reduced either by seasonal variations or by the general weather variations, the circuit detects the reduced battery charge level which ultimately results from this reduced solar illumination, and reduces the power output so that the sign will provide adequate service in poor overall solar illumination conditions, but commensurate with the average solar illumination conditions. It should be understood that because of the long sign illumination time which a full battery charge provides, it could take many weeks of low solar incidence before the battery voltage shows the resulting reduction. Furthermore, another effect of this high battery capacity is to ensure that the controller does not reduce the sign output after only a few days of inclement weather. Since such solar panels can also be charged by indirect sunlight or even plain daylight, throughout this application, the term solar illumination is understood to include, and is also thuswise claimed, all incident natural radiation, whether from direct solar radiation incident on the panel, or from ambient daylight falling on the panel.

Furthermore, the system of FIG. 16 indicates to the sign owner when the battery system is close to the end of its useful life and needs replacing, and without stopping the sign from fulfilling its function, such as by causing the sign to operate in a blinking mode. This aspect of the circuit of FIG. 16 depends for its operation to a certain extent on the high efficiency of internally illuminated signs, especially those constructed according to the various preferred embodiments of the present invention. Because of this high efficiency, the storage capacity of the batteries used provides a long period of operation without the need for solar replenishment of the charge. There is established an equivalence between the state of charge (SOC) or depth of discharge (DOD) of the battery unit, and the remaining useful life of the battery unit. If even the minimal solar exposure needed to charge the battery unit is insufficient to bring it to its full charged voltage, this is a sign that its charge capacity has waned, and that the battery life is drawing to an end. Thus, by monitoring the charged voltage of the battery, a measure of the battery life is also obtained.

This feature can be further understood by reference to some examples of internally illuminated solar signs, constructed and operative according to the preferred embodiments of the present invention. Thus, for a single digit sign, two AA-sized batteries are typically used, each providing 1,600 mA-hours of charge, i.e. 3,200 mA-hours. Since such secondary cells typically have a nominal fully charged voltage of 1.2 volts, the total stored power is thus 3,840 mW-hours. A single high intensity LED of the type used in such signs, typically takes 3 mW of power. Therefore, without any solar replenishment of the battery charge, a single set of fully charged batteries will continue to power the sign for about 1,200 hours, which represents about 3 months of continuous operation for 14 hours each night! Therefore, it is assumed that even a minimal solar illumination will bring the battery to its fully charged condition, and a measure of the battery output voltage, i.e. the SOC, at any time is therefore an indication of the battery charge capacity, which is directly related to the remaining battery lifetime.

Referring now to preferred embodiments of the circuit elements of FIG. 16, the output of the solar panel 100, which is preferably in the range of from 3 to 5 volts, is stepped down by the converter 102 to a voltage of up to 1.68 volts, which is a suitable level for charging the batteries 106. As is known in the art, the step-down converter 102 preferably operates as a current source, to ensure correct charging independently of the battery SOC. The output voltage of the solar panel is also used to operate the charging switch 104, which is turned ON by a solar panel output typical of daytime illumination, and OFF at night-time.

On the discharge side of the circuit of FIG. 16, the discharge switch 108 is turned OFF by the solar panel output voltage during the day, and ON at night, when battery power is drawn to power the LED or LED's 114 to illuminate the sign. The battery voltage of about 1.2 volts is input by the switch 108 to the step-up converter 110, also operated as a current source, which provides the correct operating voltage for the LED or LED's 114. The voltage required depends on the specific LED used. Thus for a red LED, 1.9 volts is required, while for a green LED, 3 volts is typically required.

The above-described elements are typical of prior art control circuits for solar charged illuminated signs. The circuit shown in FIG. 16, according to this preferred embodiment of the present invention, differs however from such prior art circuits by the addition of a current controller 112, which controls the current supplied to the LED or LED's 114 by the step-up converter 110. This current controller uses the battery voltage as its input, and is programmed to control the LED input current according to the battery voltage, which is indicative of the SOC of the battery, which itself depends on both the battery condition and the general level of solar illumination. Thus, the current controller is preferably programmed so that when the SOC falls below a certain predetermined level, indicating a reduced solar input level, or a fading battery, the power fed to the LED or LED's is reduced, thereby adapting the sign illumination output to the available solar radiation input, or to the state of the battery. The controller is preferably programmed to provide a graded reduction in power output according to the SOC. In the example brought hereinabove, the lowest level of current provided by the controller 110 under worst state conditions is preferably such as to reduce the illumination provided to the LED to 1.5 mW, which is only half of the full LED power.

When the SOC falls below that minimum level, which is indicative of an almost empty battery, either because of total lack of solar input or because of a battery almost at the end of its useful life, the controller is preferably controlled to switch the LED to a blinking mode, preferably at a 50% duty cycle. This has two effects. Firstly, it doubles the remaining illumination time without further solar input, before the sign goes out completely, and secondly, it warns the sign owner that the battery may be close to the end of its life and may need replacing. The latter warning is especially relevant where there is solar radiation, and the battery still shows a low SOC. Using the above described example, the controller may preferably be programmed to provide blinking mode operation when there remains only 80 mW-hours in the battery pair, this being sufficient to operate a LED at 1.5 mW, i.e. half power, and at 50% duty cycle blinking mode, for about 100 hours without any further solar input charge.

The above-described controller 110 of the present invention, can preferably be implemented in the form of an ASIC chip, as is well known in the art of electronic control circuitry.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

APPENDIX A

Derivation of the formulae (3), (4) and (5) (for one half of a double-sided sign) In FIG. 11:

A: location of light source 46.

O: the end point of the diffuser screen, on the optical axis of the light beam and used as the origin of the x-y plane for the purposes of this calculation.

<OAG: the half-angle of the light beam emitted from A, called $\theta_{1/2}$.

Δ: the angle subtended by each segment of the beam, where $\Delta=\theta_{1/2}/N$, and N is an integer dividing the half-angle of the beam into small incremental angles.

α: the angle between the end of the diffuser screen at the origin, and the y axis.

OB: the first Δ segment span on the diffuser screen.

CD: the (i+1)th segment.

$x_i$, $y_i$: co-ordinates of C.

$x_{i+1}$, $y_{i+1}$: co-ordinates of D.

$CF:=x_{i+1}-x_i$ $DF:=y_{i+1}-y_i$ $AO:=I$ $AC:=I_i$ $AD:=I_{i+1}$

The purpose of the formulae (3), (4) and (5) is to supply the points of curvature that define segments that have the same subtended angle, Δ, of the light source A, and are equally spaced apart from each other on the diffuser screen.

The constant distance between the points is OB, the same as the distance of the first segment.

$$OB=(I\cdot\Delta)/\sin\alpha$$

For the (i+1)th segment:

$$CD=OB=(I\cdot-\Delta)/sin\ \alpha$$

$$CE=\Delta\cdot AC=\Delta\cdot I_i$$

$$<DCE=\cos^{-1}\cdot CE/CD=\cos^{-1}(I_i\cdot\sin\alpha/I)$$

and:

$$DE=(CD^2-CE^2)^{1/2}=\Delta\cdot\{(I/\sin\alpha)^2-I_i^2)^{1/2}$$

As Δ is small, $$AD=AC-DE$$

from which, formula (5) can be directly derived:

$$I_{i+1}=I_i-\Delta\cdot\{(I/\sin\alpha)^2-I_i^2)^{1/2} \quad (5)$$

In order to obtain the co-ordinates $x_{i+1}$ and $y_{i+1}$ to $x_i$ and $y_i$ must be added the lengths of CF and DF respectively.

$$<ECF=<EDF=<EAO=(i+1)\cdot\Delta$$

$$<DCF=<DCE=<ECF=\cos^{-1}(I_i\cdot\sin\alpha/I)+(i+1)\cdot\Delta$$

Consequently:

$$x_{i+1}-x_i=CF=CD\cdot\cos<DCF$$

$$y_{i+1}-y_i=DF=CD\cdot\sin<DCF$$

from which, formulae (3) and (4) can be directly derived:

$$x_{i+1}=x_i+\Delta\cdot I/\sin\propto\cdot\cos\{\Delta(i+1)+\cos^{-1}(I_i\sin\propto/I)\} \quad (3)$$

$$y_{i+1}=y_i+\Delta\cdot I/\sin\propto\cdot\sin\{\Delta(i+1)+\cos^{31}(I_i\sin\propto/I)\} \quad (4)$$

The invention claimed is:

1. An internally illuminated sign, comprising:

at least one source of light; and at least one display surface illuminated by said light and comprising regions generally opaque to said light and regions diffusively transmissive to said light, said diffusively transmissive regions forming at least one character to be displayed by said sign, wherein said at least one source of light is mounted such that said light is directed at said at least one display surface at close to a glancing angle, and said at least one display surface has a curved contour, concave to said at least one source, and such that light from said at least one source impinges on said display surface at an angle of incidence which varies according to the distance of the point of impingement of said light from said light source.

2. An internally illuminated sign according to claim 1, wherein said curved contour reduces variations in the luminous flux per unit area of said light impinging on said at least one display surface, in comparison with variations in said luminous flux per unit area impinging on a non-curved display surface.

3. An internally illuminated sign according to claim 1 and further comprising at least one reflective surface disposed adjacent said at least one display surface, and reflecting light towards said at least one surface.

4. An internally illuminated sign according to claim 1, further comprising a second display surfaces illuminated by said light.

5. An internally illuminated sign according to claim 1, wherein said curved contour is shaped such that the luminous flux per unit area of said light impinging on said at least one display surface is essentially independent of the distance of the point of impingement of said light from said at least one light source.

6. An internally illuminated sign according to claim 1, wherein the side of said generally opaque regions of said at least one display surface facing said at least one source of light comprises a reflective layer, such that said light not transmitted through said at least partly transmissive regions of said one display surface is reflected back into said sign.

7. An internally illuminated sign according to claim 4, and further comprising at least one reflective surface having a curved contour, convex to said at least one light source, and disposed between said two display surfaces illuminated by said light.

8. An internally illuminated sign according to claim 1, wherein said at least one source of light comprises at least one light emitting diode.

9. An internally illuminated sign according to claim 6, wherein said at least one display surface comprises:

a reflective metallic layer, on which is formed a generally opaque coating defining a negative of the shape of said character, such that said character defines a clear area over said reflective metallic layer, said clear area being a mask for the removal of said reflective metallic layer in the region of said character.

10. An internally illuminated sign according to claim 1, further comprising at least one rechargeable battery for powering said at least one source of light, and at least one solar cell for recharging said rechargeable battery.

11. An internally illuminated sign according to claim 9, wherein said at least one display surface is produced by a method comprising the steps of:

forming said character on said reflective metallic layer by means of a generally opaque coating applied around said character shape, such that said character defines a clear area over said reflective metallic layer; and removing said reflective metallic layer in the region of said character, using said clear area as a mask.

12. An internally illuminated sign according to claim 1, wherein said at least one source of light is disposed adjacent an end of said at least one display surface.

13. An internally illuminated sign according to claim 1, wherein said at least one source of light comprises a plurality of light sources disposed in the central region of said at least one display surface, at least two of said plurality of light sources pointing in essentially opposite directions, such that said sign is double-ended.

14. A method of improving the uniformity of illumination on at least one display surface of an internally illuminated sign, comprising the steps of:

providing at least one source of light for illuminating said at least one display surface;

providing said display surface with a curved contour; and directing said light at said display surface at close to a glancing angle, such that said curved contour reduces variations in the luminous flux per unit area of said light impinging on said at least one display surface, in comparison with variations in said luminous flux per unit area impinging on a corresponding non-curved display surface.

15. A method according to claim 14 and wherein said curved contour is shaped such that said luminous flux per unit area of said light impinging on said at least one display surface is essentially independent of said distance of the point of light impingement from said at least one source.

16. A method according to claim 15 and wherein said curved contour is determined by a method comprising the steps of:

dividing said at least one display surface into areas according to the distance of said areas from said source;

determining the illumination falling on a first area of said at least one display surface as a function of the distance of said area from said at least one source and the angular orientation of said area relative to the direction to said at least one source;

determining the distance of a second area of said display surface from said at least one source; and calculating the angular orientation required of said second predefined area of said at least one display surface such that said first and said second predefined areas of said screen receive essentially the same illumination.

* * * * *